US008682947B2

(12) United States Patent
Tronstad

(10) Patent No.: US 8,682,947 B2
(45) Date of Patent: Mar. 25, 2014

(54) RANDOM NUMBER GENERATOR

(75) Inventor: Erik Tronstad, Søgne (NO)

(73) Assignee: Superdize AS, Grimstad (NO)

( * ) Notice: Subject to any disclaimer, the term of this patent is extended or adjusted under 35 U.S.C. 154(b) by 651 days.

(21) Appl. No.: 12/989,609

(22) PCT Filed: May 18, 2009

(86) PCT No.: PCT/NO2009/000187
§ 371 (c)(1),
(2), (4) Date: Nov. 11, 2010

(87) PCT Pub. No.: WO2009/142505
PCT Pub. Date: Nov. 26, 2009

(65) Prior Publication Data

US 2011/0055302 A1 Mar. 3, 2011

(30) Foreign Application Priority Data

May 21, 2008 (NO) .................................... 20082290

(51) Int. Cl.
*G06F 1/02* (2006.01)
*A63F 9/04* (2006.01)

(52) U.S. Cl.
USPC .......................................... 708/250; 273/146

(58) Field of Classification Search
USPC .......................................... 708/250; 273/146
See application file for complete search history.

(56) References Cited

U.S. PATENT DOCUMENTS

| | | | | |
|---|---|---|---|---|
| 4,641,840 | A * | 2/1987 | Larson | 463/22 |
| 6,106,394 | A | 8/2000 | Furlong | |
| 6,926,276 | B1 | 8/2005 | Zocchi | |
| 2004/0036213 | A1* | 2/2004 | Lindsey | 273/146 |
| 2004/0160000 | A1* | 8/2004 | Lindsey et al. | 273/146 |
| 2005/0079452 | A1 | 4/2005 | Miller et al. | |
| 2005/0164778 | A1 | 7/2005 | Cooney | |

FOREIGN PATENT DOCUMENTS

| | | | |
|---|---|---|---|
| DE | 3238373 | A1 | 4/1984 |
| DE | G9001119.8 | U1 | 4/1990 |
| DE | 202005001858 | U1 | 5/2005 |
| DE | 202006006264 | U1 * | 7/2006 |
| EP | 0619566 | A2 | 3/1994 |
| EP | 1103291 | A1 | 11/1999 |
| GB | 636716 | | 5/1950 |
| GB | 1574704 | | 9/1980 |
| GB | 2342868 | A | 4/2000 |
| IT | 01246876 | | 11/1990 |
| JP | 2004081359 | | 3/2004 |

* cited by examiner

*Primary Examiner* — Chuong D Ngo
(74) *Attorney, Agent, or Firm* — GableGotwals

(57) ABSTRACT

A rollable random number generator (1) for providing a random value. The random number generator comprises a processor (11) controllable by a movement sensor (17) and the processor (11) being arranged to be programmable to present the random value as a desired message.

9 Claims, 2 Drawing Sheets

RANDOM NUMBER GENERATOR

CROSS-REFERENCE TO RELATING APPLICATIONS

Figure 1:
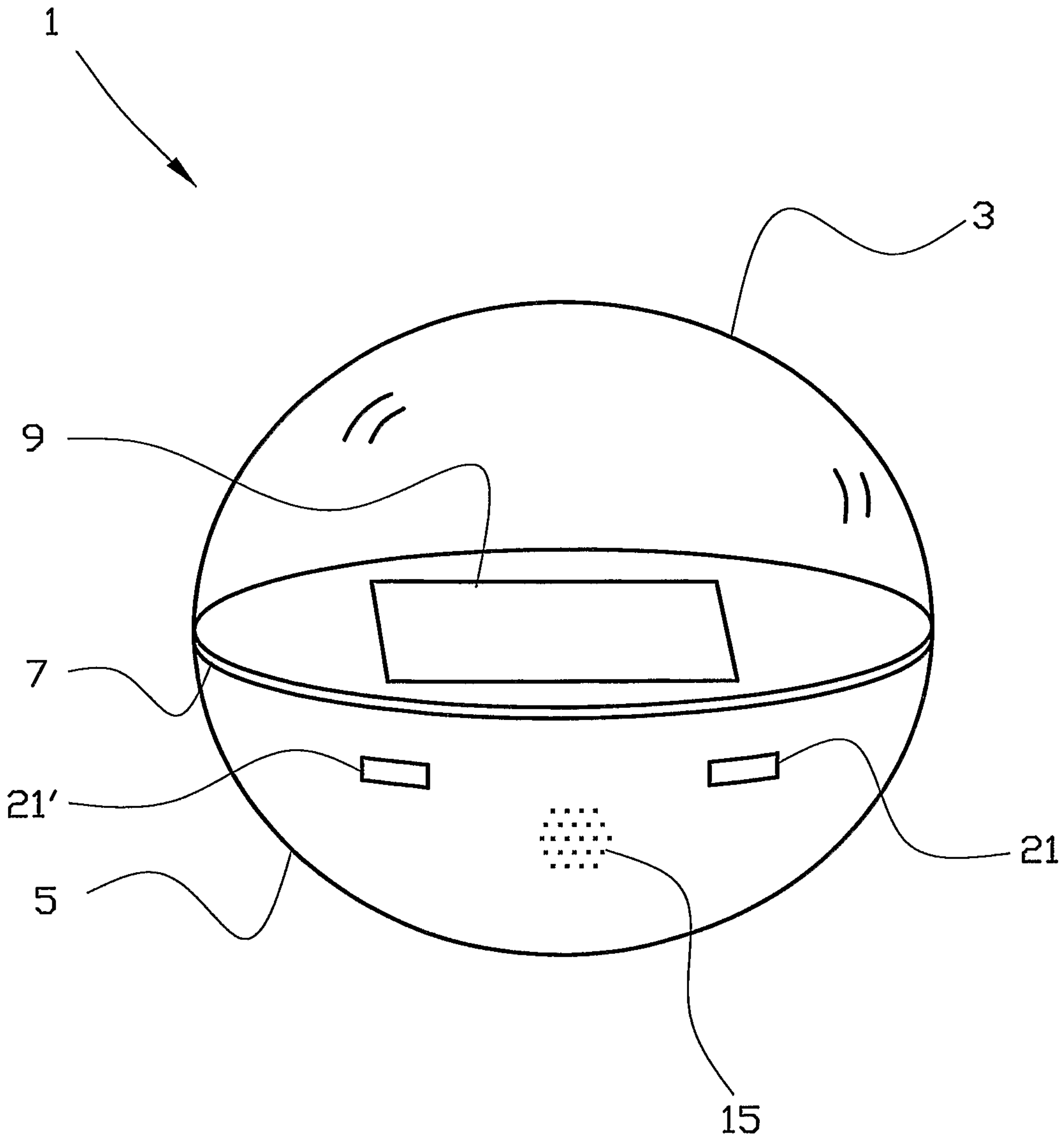

This application is the United States National Phase of PCT patent application Ser. No. NO2009/000187 filed on 18 May 2009, which was published in English on 26 Nov. 2009 under Publication No. WO2009/142505A1, which claims priority to Norwegian patent application Ser. No. 20082290 filed 21 May 2008, both of which are incorporated herein by reference.

The present invention relates to a device for use in performance of games. More particularly it concerns a random number generator device for providing a random value, where the device is arranged to be able to be rolled or trundled on a surface.

By the term rolled is in this document meant that the device may rotate in any direction relative to its centre of gravity and at the same time stay substantially in contact with the surface it is rolling on. The device according to the invention may thus have any shape or form arranged to be able to be rolled or trundled on a surface.

The result in a game that may be categorised as a so-called game of fortune is normally influenced by a device arranged to be able to bring forward a random value. Examples of well known devices of this sort is a dice, a pack of cards, a roulette wheel and numbered balls being randomly drawn from a container such as in bingo and lotto games.

Most of the above well-known devices may be carried along nearly everywhere, and are easily understandable. They have however the drawback that they bring forward a relatively limited number of values or outcome.

The number of surfaces on the dice will limit the outcome when trundling such as a dice, which most probably is one of the most utilised random number generators in games, where six is the normal number of surfaces. The outcome may of course be increased by utilising two or more dice, but the value one will not be able to appear unless the dice contain a "zero" value. Dice may thus not be utilised in such as bingo or lotto games where there is a requirement that every number shall carry equal probability of being drawn.

A deck of cards or a roulette wheel is in a comparable manner limited regarding the outcome.

From the patent literature is known a great number of publications providing alternatives to the above known devices.

From GB 636,716 is known a ball shaped dice box having an offset centre of gravity, and where dice known per se are loosely provided inside the box. When the ball is rolled, it will, due to the offset centre of gravity quickly come to rest; whereafter the dice may be read.

From U.S. Pat. No. 6,926,276 is known a ball shaped dice having a plurality of sides provided with numbers. The ball is filled with a material that makes it stop quickly. The ball functions like a dice.

From JP 2004081359 and IT 1246876 are known ball shaped dice where numbers are provided on the outside of the dice.

From EP 619 566 is known a lotto number generator arranged to choose a random number from a certain series of numbers. The lotto number generator is provided with a sound generator arranged to communicate the number by means of sound from a loudspeaker.

From US 2005164778 and EP 1,103,291 are known dice with six sides where each of the dice is provided with a movement sensor. A predetermined time after the dice has come to rest after it has been rolled, the dice according to US 2005164778 will present the result visually/or by means of sound, while the dice of EP 1,103,291 will transmit the result to a PC.

From U.S. Pat. No. 6,106,394 is known a random number generator which is cylindrically shaped and which can rotate about a vertical axis. The cylinder is stopped by means of friction, and the value may be read in a window in the cylinder.

Prior art according to the above publications have in addition to already mentioned drawbacks, the further drawback that they are limited to communicate a message of a sort laid down by production of each device.

The object of the invention is to remedy or reduce at least one of the prior art drawbacks.

The object is achieved as stated in the below description and in the following claims.

According to the present invention there is provided a rollable random number generator for generating a random value, wherein the random number generator comprises a processor controlled by a movement sensor, and wherein the processor is arranged to be able to be programmed to present the random value as a desired message.

The desired message is one of or a combination of numbers, letters, words, symbols, shapes, pictures or sound. The sound may for example, but not limited to, be a simple sound signal, voice or music.

In one embodiment the message is presented by means of a display and/or a loudspeaker provided in the random number generator.

In one embodiment the random number generator is provided with a data communication device for communication with peripheral equipment. The peripheral equipment may be such as, but not limited to, a computer or a cell phone arranged to be able to communicate with the random number generator processor so that this may be programmed to present a message in the desired form such as numbers, letters, words, symbols, shapes, pictures or sound or a combination of two or more of these. The peripheral equipment may be connected to external databases for example via Internet, for downloading of a desired program.

The communication may be wireless or by cable connected to the random number generator and the peripheral equipment. The communication is preferably by means of standardised technologies such as, but not limited to Bluetooth or USB.

In one embodiment is the random number generator arranged to transmit the message brought forward to the peripheral equipment so that the message is presented by means of this alone or in addition to a display and/or a loudspeaker provided in the random number generator.

The random value is preferably provided by means of a so-called "Pseudo random number generator (PRNG)". Alternatively the random value is provided by means of an apparatus providing a random value from a physical process, a so-called "Hardware random number generator" or "True random number generator (TRNG)". PRNG and TRNG are well known concepts for a person skilled in the art, and will not be discussed further in this document.

In one embodiment the random number generator has a substantially ball shaped form so that it will roll on a surface. The ball shape may be round or unround.

To provide for a relatively quick halt or the possibility for a non-linear direction in the rolling movement, the centre of gravity of the device is provided offset relative to a central point. An offset centre of gravity is particularly useful when the device is ball shaped.

In one embodiment the outside surface of the device is further provided with a plurality of projections. The object of the projections is to provide for an unanticipated movement path.

As an alternative to said projections the outside surface of the device is provided with a plurality of recesses or cut-off portions to be able to achieve the same effect as said projections. A random number generator being basically ball shaped with a plurality of cut-off portions will constitute a polygonal dice.

Figure 2:
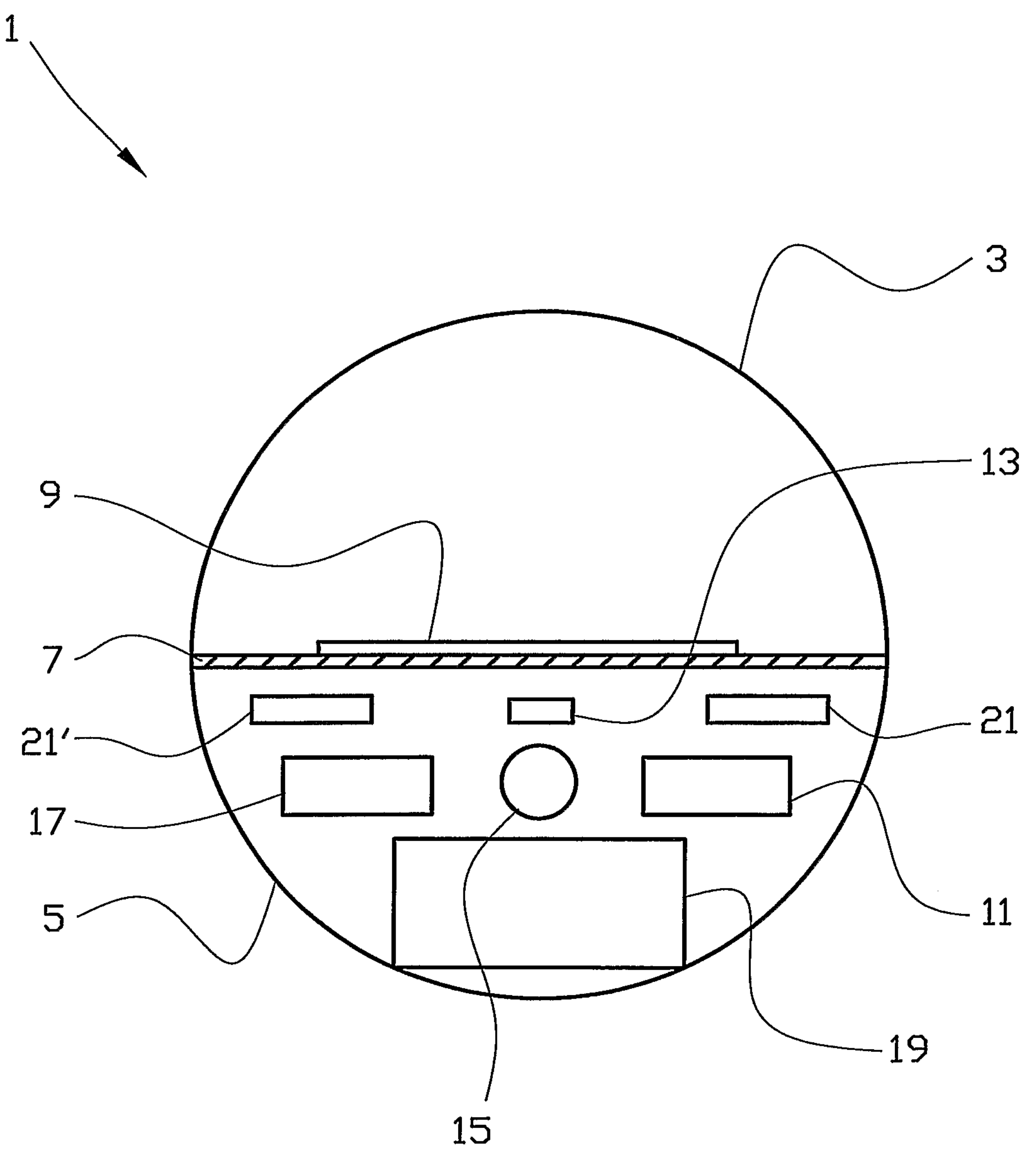

In the following is described an example of a preferred embodiment which is illustrated in the accompanying drawings, wherein:

FIG. 1 shows a perspective view of a random number generator according to the invention; and FIG. 2 shows a principle drawing of a section taken of a random number generator of FIG. 1.

In the Figures the reference numeral 1 indicates a random number generator according to the present invention. The random number generator 1 is in the shown embodiment allocated a substantially ball shaped form and is defined by an upper transparent portion 3 and a lower non-transparent portion 5. It is to be understood that in alternative embodiments both or none of said portions 3, 5 may be fabricated in a transparent material. This is however immaterial for the invention.

In the boundary area between the upper portion 3 and the lower portion 5 is provided a plane portion 7 whereon is attached a display 9. In an alternative embodiment (not shown) the display constitutes a portion of the external surface of the random number generator 1.

In a space defined by the plane portion 7 and the lower non-transparent portion 5 there is provided a plurality of components known per se necessary for providing a random number generator according to the invention.

A person skilled in the art will recognise that only some of the necessary components are shown, that these are shown in principle, and that there are connections between some of the components and also between the display 9 and some of the components. The components are typically connected to a not shown printed circuit card.

The components shown are made up of a processor 11 connected to a data communication device 13 for transmission of data to/from a not shown peripheral equipment such as a computer or a cell phone. Programs for desired game and desired message may thus be transmitted from said peripheral equipment to the random number generator 1. The message being shown may also be stored in databases connected to the peripheral equipment directly or via for example Internet.

While the game is being played the result, i.e. the message, is shown on the display 9 and/or on a display connected to the peripheral equipment. Alternatively, or in addition to showing the message on said display 9, the message may be communicated by means of a sound-generating device 15.

To be able to sense that the random number generator 1 has come completely or partly to a halt following a movement to thereby provide the message, the random number generator is provided with a movement sensor 17.

The necessary power to run the random number generator 1 is provided by a battery 19.

In the embodiment shown, the battery 19 is positioned as far away as possible from the plane portion 7 extending through a central portion of the random number generator 1. The object of such positioning of the battery 19 is to be able to provide an offset centre of gravity both for the random number generator 1 to halt relatively quickly after having been set in rolling motion on a surface, and that it shall be able to show a non-linear direction of movement, and for the upper, transparent portion 3 to face upward when the random number generator 1 is at rest so that the display 9 is visible for the game players in a best possible way.

The random number generator 1 is in the embodiment shown provided with two control buttons 21, 21'. In its simplest form the control buttons 21, 21' are on/off buttons. In a variant of the random number generator 1 the control buttons 21, 21' are however so-called multi functional buttons being used to manoeuvre in a user menu shown on the display 9.

By means of the user menu and the control buttons 21, 21' a choice may be made between several games, which may be pre-installed or installed by a user. The different games will be able to bring forward the message being shown in the display 9 or be communicated by means of the sound generating device 15, in different ways.

If the random number generator 1 is chosen to represent a dice with six sides, one of the numbers one to six will be shown in the display 9 and/or communicated by means of the sound-generating device 15 after the random number generator has come to rest. Game dice having more than six sides may also be chosen.

If the random number generator 1 is chosen to be a lotto machine or a bingo machine, one of a chosen series of numbers will be shown in the display and/or be communicated by means of the sound-generating device 15.

As a last example the random number generator 1 may be used in a game of the "Trivial Pursuit" type where a randomly chosen question of a series of questions stored in advanced will be brought forward as mentioned above. The answer to the relevant question may be provided by for example pressing one of the control buttons 21, 21'.

It is to be understood that the random number generator 1 may also be controlled by means of peripheral equipment such as a computer or a cell phone and that said buttons then are not needed.

A person skilled in the art will understand from the above that the random number generator 1 according to the present invention may be programmed to be adapted to a large number of games and needs wherein there is a desire to undertake a random choice for example from a database connected to the random number generator 1.

The invention claimed is:

1. A rollable random number generator (1) for generating a random value, the random number generator (1) comprises:

a processor (11) being controlled by a movement sensor (17), the processor (11) being arranged to be programmed to present the random value as a desired message, wherein the center of gravity of the random number generator (1) is fixed and arranged offset relative to a center point for allowing a same part of the random number generator to face upward when the random number generator comes to rest after being set in motion.

2. The random number generator according to claim 1, said desired message is a member selected from the group consisting of one or a combination of numbers, letters, words, symbols, shapes, pictures, and sounds.

3. The random number generator according to claim 2, said desired message is presented by at least one of a display (9) and a loudspeaker (15) arranged in said random number generator (1).

4. The random number generator according to claim 1, said random number generator (1) being provided with a data communication device (13) for communication with peripheral equipment.

5. The random number generator according to claim 1, said random value being provided by a pseudo random number generator.

6. The random number generator according to claim 1, said random value being provided by a physical process.

7. The random number generator according to claim 1, said random number generator (1) has a substantially ball shaped form.

8. The random number generator according to claim 7, a external surface of said random number generator (1) is further provided with a plurality of projections.

9. The random number generator according to claim 7, a external surface of said random number generator (1) is further provided with a plurality of recesses.

* * * * *